United States Patent [19]

Kawaharazaki

[11] 4,374,594

[45] Feb. 22, 1983

[54] EMERGENCY BUCKLE DEVICE

[75] Inventor: Takashi Kawaharazaki, Aichi, Japan

[73] Assignee: Kabushiki-Kaisha Tokai-Rika-Denki-Seisakusho, Aichi, Japan

[21] Appl. No.: 178,595

[22] Filed: Aug. 15, 1980

[30] Foreign Application Priority Data

Aug. 20, 1979 [JP] Japan ............................ 54-114934[U]

[51] Int. Cl.³ ............................................. B60R 21/10
[52] U.S. Cl. ................................. 280/801; 280/808; 297/484; 24/230 A
[58] Field of Search ....................... 280/801, 802, 808; 24/230 A, 230 AS; 297/486, 484

[56] References Cited

U.S. PATENT DOCUMENTS 4,194,764  3/1980  Grimm ............................ 280/801
4,245,856  1/1981  Ziv ................................. 280/801

Primary Examiner—Richard A. Bertsch
Attorney, Agent, or Firm—Stevens, Davis, Miller & Mosher

[57] ABSTRACT

An emergency buckle device used in a seatbelt system wherein the outer end of an occupant restraining webbing is engaged with a door, whereby the intermediate portion of the webbing is adapted to approach or recede from the seated occupant in accordance with the closing or opening action of the door so as to automatically fasten the webbing to or unfasten same from the occupant. A tonque plate secured to the outer end of the webbing is inserted into a main body of the buckle, where said tongue plate is held in a clamp like manner between a lock pin and a release pin. When the tongue plate is to be inserted, the lock pin is separated from the release pin to form therebetween a path for receiving the tongue plate, and, when the tongue plate is to be extracted, the release pin is separated from the lock pin to form therebetween a path for allowing the tongue plate to escape therethrough, so that the device as a whole can be rendered compact in size and an anchor point for the outer end of the webbing can be disposed comparatively backwardly in the vehicle.

5 Claims, 4 Drawing Figures

4,374,594

EMERGENCY BUCKLE DEVICE

BACKGROUND OF THE INVENTION

1. Field of the Invention

This invention relates to an emergency buckle device for use in a seatbelt system for protecting an occupant of a vehicle in an emergency.

2. Description of the Prior Art

There has been proposed passive seatbelt systems for automatically fastening a restraining webbing to an occupant upon his entering a vehicle. In one type of the abovementioned passive seatbelt systems, an outer end of the occupant restraining webbing is secured to a door of the vehicle, and the intermediate portion of the webbing is caused to approach or recede from an occupant's seat in accordance with the closing or opening action of the door, whereby the webbing is automatically fastened to or unfastened from the occupant.

In a passive seatbelt system of the type just described, the outer end of the occupant restraining webbing is secured to the door through an emergency buckle device, whereby said buckle device causes the vehicle door to reliably support the tension on the webbing generated by an inertial force of the occupant in an emergency of the vehicle, so that the occupant can be secured in the restrained state. Furthermore, after a collison, the webbing is released from the buckle device thereby unfastening the webbing from the occupant, and the door is made openable thereby enabling the occupant to quickly escape from the vehicle.

However, in the emergency buckle devices described above, a large-sized buckle device such as those used in fastening the webbing to or unfastening same from the occupant in conventional seatbelt systems is utilized. Consequently the anchor point where the outer end of the webbing is engaged with the buckle device is disposed comparatively further forward in the vehicle, whereby the fastening of the webbing to the occupant is not necessarily made in a proper arrangement during normal running condition of the vehicle, thereby giving an uncomfortable feeling to the occupant and displaying unsatisfactory occupant restraining performance in an emergency such as a collision of the vehicle.

SUMMARY OF THE INVENTION

The present invention has been developed to obviate the abovedescribed problems of the prior art, and has as its object the provision of an emergency buckle device being compact in size and in which an anchor point of the webbing is disposed rearwardly in the vehicle so as to provide a preferable restrained state of an occupant.

The emergency buckle device according to the present invention is of such an arrangement that the main body of the buckle is provided therein with a lock pin and a release pin. The lock pin is separated from the release pin to form a path for receiving a tongue plate. When the tongue plate is inserted, the lock pin engages with the tongue plate to prevent the tongue plate so as from falling off upon completion of insertion. The release pin is separated from the lock pin to form a path for allowing the tongue plate to escape therethrough when the release pin is disengaged from the tongue plate.

Description will hereunder be given of an embodiment of the present invention with reference to the drawings.

DESCRIPTION OF THE PREFERRED EMBODIMENT

Figure 1:
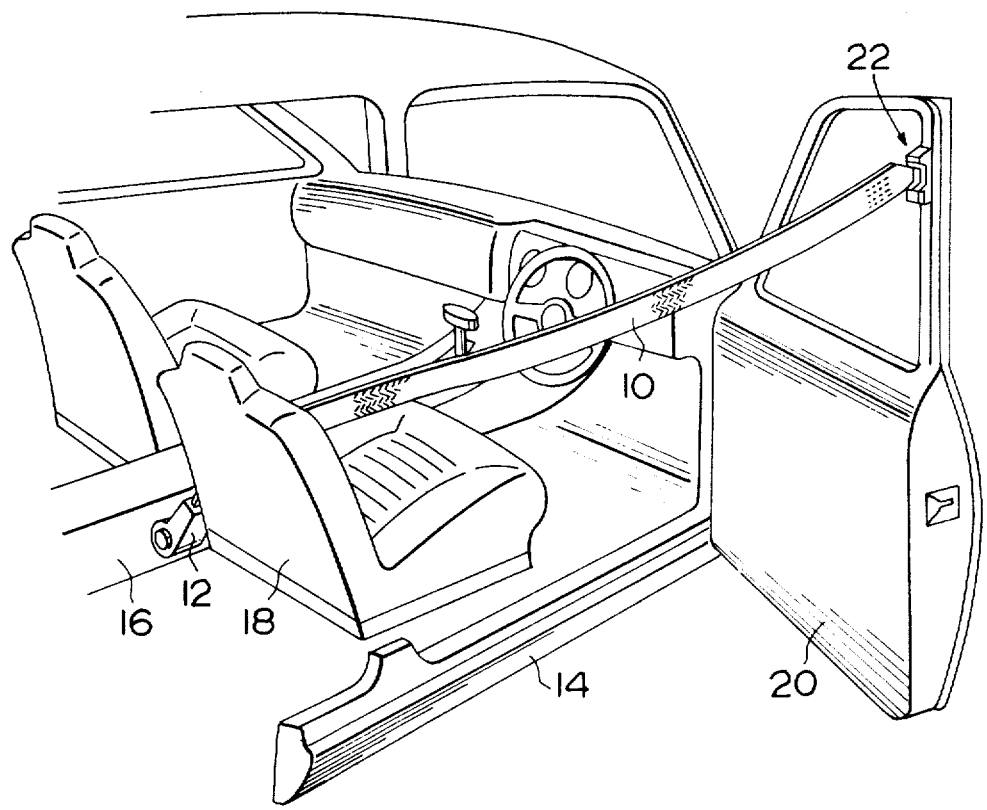
FIG. 1 is a perspective view showing the emergency buckle device embodying the present invention.

Referring to FIG. 1, an inner end of an occupant restraining webbing 10 is wound up by a retractor 12, which is secured to a tunnel portion 16 provided substantially at the center of a vehicle. The retracter 12 winds up the webbing 10 by its biasing force and incorporates therein an inertia lock mechanism (not shown) for preventing the webbing 10 from being suddenly unwound.

The intermediate portion of the webbing 10 passes through the upper portion of an occupant's seat 18 and the outer end thereof is engaged with an emergency buckle device 22 secured to the upper rear portion of a door 20. The outer end of the webbing 10 is engaged with the emergency buckle device 22 such that, as shown in FIGS. 2 and 3, a tongue plate 24 secured to the outer end of the webbing 10 is engaged with the buckle device 22.

The buckle device 22 is provided with a buckle base 26, which is solidly secured to a door frame 30 of the door 20 through mounting bolts 28.

Figure 4:
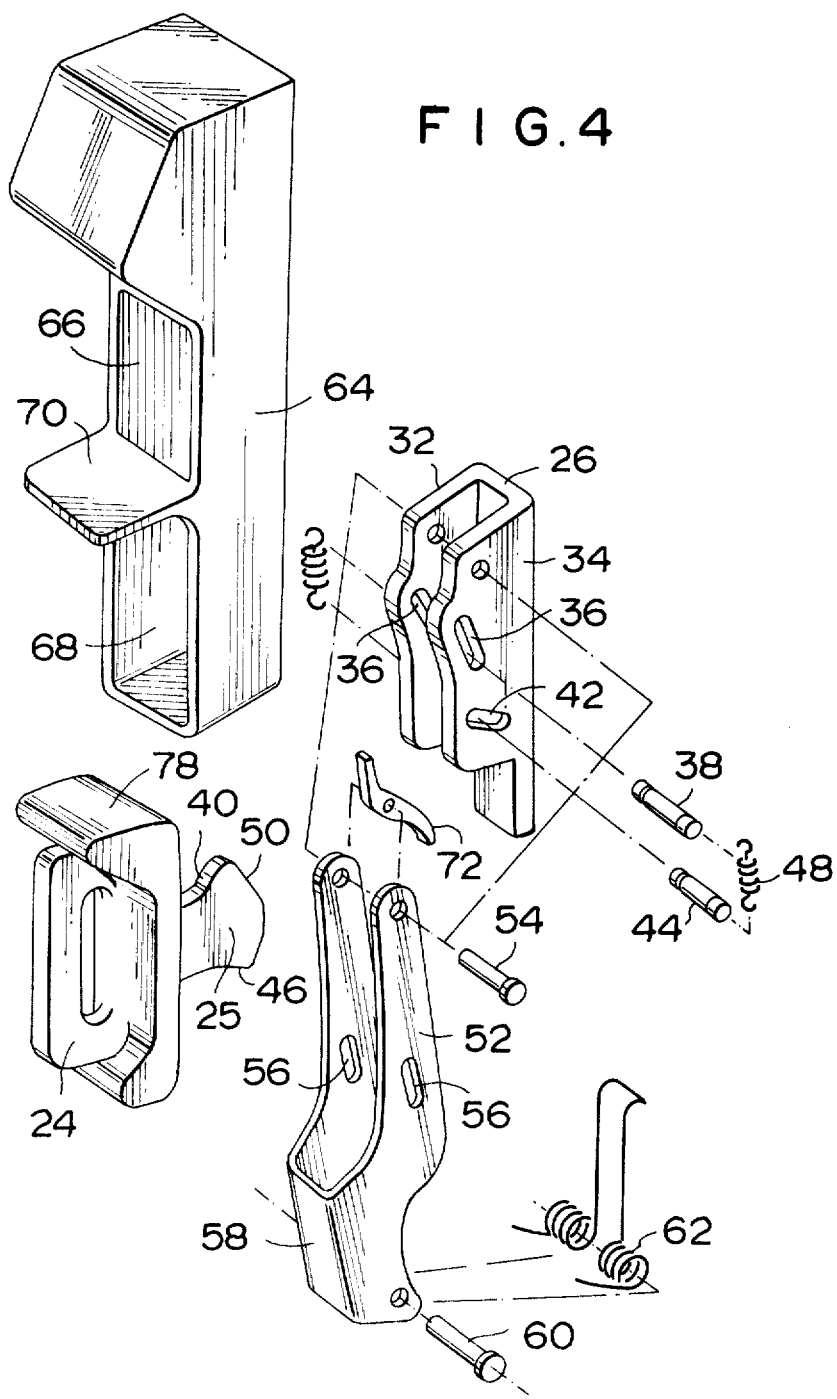
FIG. 4 is a disassembled perspective view showing the buckle device.

As shown in FIG. 4, the buckle base 26 has formed at opposite sides thereof legs 32, 34 which are bent perpendicularly to the buckle base 26 and are in parallel to each other. The legs 32, 34 of the buckle base 26 are adapted to receive therebetween an insert portion 25 of the tongue plate 24.

Figure 2:
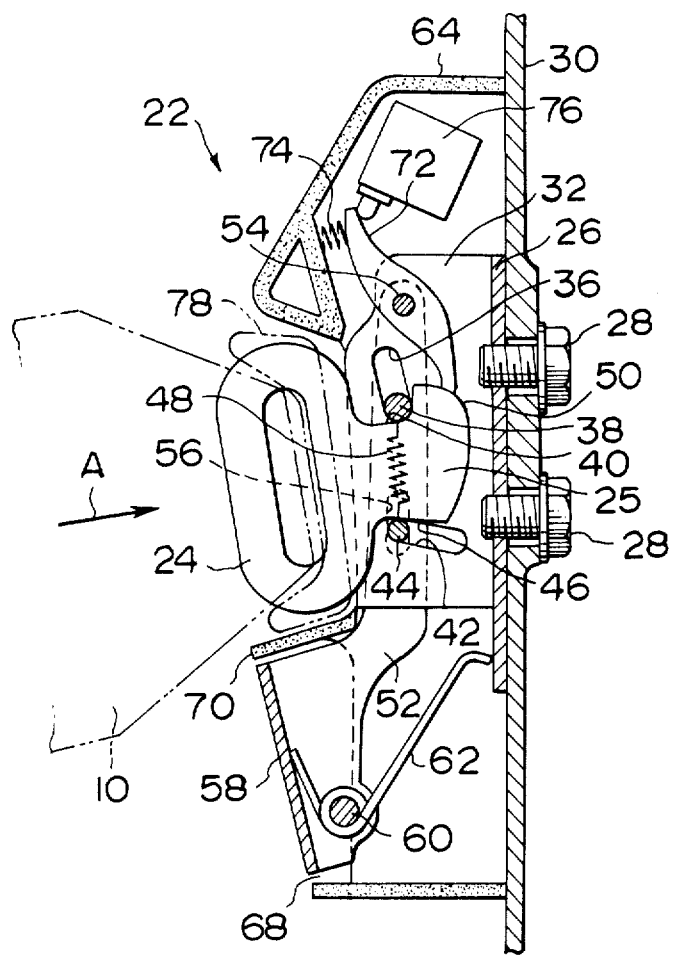
FIG. 2 is a sectional view showing the buckle device.
Figure 3:
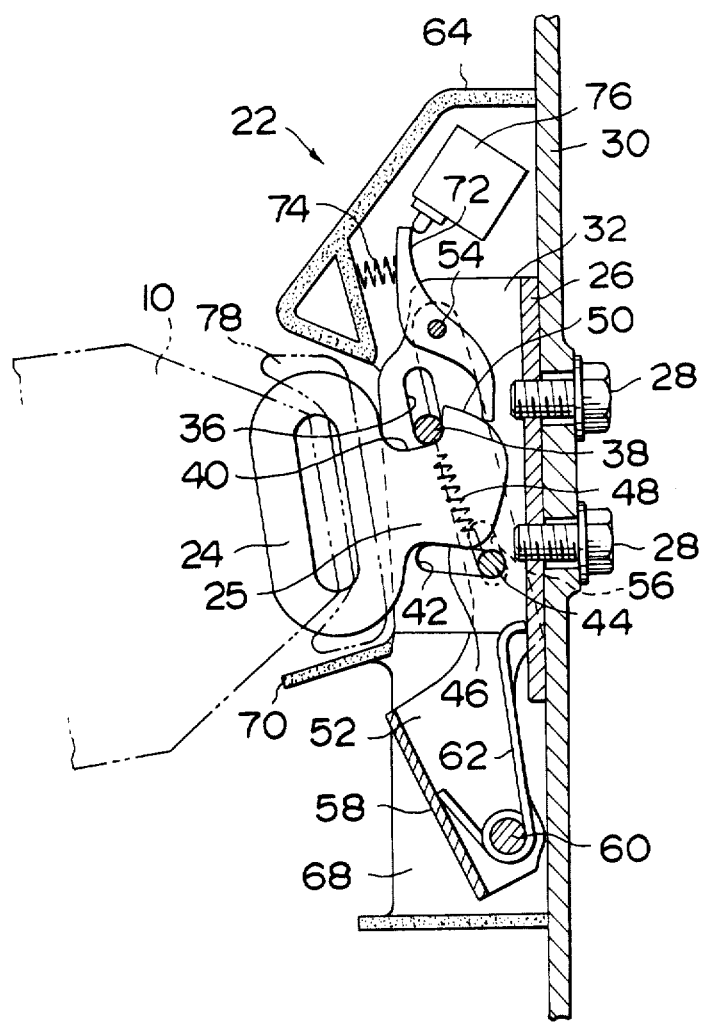
FIG. 3 is a view illustrating the buckle device of FIG. 2 in an actuated position.

The buckle base 26 is formed with slots 36 which have a longitudinal axis substantially perpendicular to the direction of insertion of the insert portion 25 of the tongue plate 24 (a direction indicated by an arrow A in FIG. 2). The slots 36 receive therein opposite end portions of a lock pin 38. Consequently, the lock pin 38 is movable along the longitudinal direction of the slots 36, whereby said lock pin 38 is adapted to approach or recede from the insert portion 25 of the tongue plate 24. The lock pin 38 is adapted to engage with an engageable groove 40 formed at one side of the insert portion 25 when approaching the insert portion 25.

On the other hand, the buckle base 26 is penetratingly provided therein with slots 42 substantially along the direction of insertion of the tongue plate 24, the slots 42 receiving therein opposite end portions of a release pin 44. Consequently, the release pin 44 is movable along the longitudinal direction of the slots 42, in a direction substantially perpendicularly to the direction of the movement of the lock pin 38, and can be slidable with a straight-lined portion 46 of the insert portion 25 of the tongue plate 24, the straight-lined portion 46 being provided in opposed relation to the engageable groove 40. With this arrangement, the release pin 44, when it moves in the same direction as the tongue plate 24 being inserted, is separated from the lock pin 38 to enlarge a space formed therebetween as shown in FIG. 3, thereby forming an escape path for the insert portion 25.

A tensile coil spring 48 is stretched between the release pin 44 and the lock pin 38, whereby said lock pin 38 and release pin 44 are biased in a direction approaching toward each other. Consequently, when the release pin 44 moves in a direction receding from the lock pin 38 as shown in FIG. 3, the lock pin 38 is urged toward one end of the slot 36, whereby the lock pin 38 will not recede from the engageable groove 40 of the tongue plate 24. Furthermore, when the insert portion 25 of the tongue plate 24 is inserted into the buckle device 22 in the direction indicated by an arrow A, shown in FIG. 2 most of the inserting force of the tongue plate 24 acts on the release pin 44 in a direction which moves the release pin 44 perpendicularly to the longitudinal direction of the slots 42, whereby the release pin 44 will not move. On the other hand, when the tongue plate 24 is inserted, an inclined portion 50 formed at the forward end of the insert portion 25 comes into abutting contact with the lock pin 38 and moves the lock pin 38 along the slots 36 by means of a cam action, whereby the lock pin 38 moves in a direction receding from the insert portion 25 of the tongue plate 24 and the release pin 44 so as to form a path for receiving the insert portion 25. After the tongue plate 24 has been satisfactorily inserted, the lock pin 38 is again brought into engagement with the engageable groove 40 by the biasing force of the tensile coil spring 48, as shown in FIG. 2.

A release plate 52 is disposed at the outer sides of the legs 32, 34 of the buckle base 26, and pivotally supported on the legs 32, 34 of the buckle base 26 through a pin 54 penetrating through end portions thereof. Slots 56 are penetrated through the intermediate portions of the release plate 52 and receive opposite end portions of the release pin 44. Furthermore, the other end portion of the release plate 52 is formed into a press portion 58, and torsional coil springs 62 are confined between the press portion 58 and the buckle base 26 by means of a spring engaging pin 60. The release plate 52 is adapted to move the release pin 44 in a direction approaching the release plate 52 toward the lock pin 38 through the slots 56 thereof by means of the biasing force of said springs 62. When the occupant presses in the press portion 58, the slots 56 of the release plate 52 cause the release pin 44 to move along the slots 42 of the buckle base 26 in a direction away from the lock pin 38.

The outer periphery of said buckle device 22 is received in a buckle case 64 made of a synthetic resin material, the buckle case 64 providing an outer skin for the buckle device 22 and serving as a dust cover, and the buckle case 64 being provided with a tongue plate insertion hole 66 and a release operation hole 68 at upper and lower portions thereof, respectively, with a separator plate 70 projecting therebetween. Consequently, the buckle case 64 has an arrangement whereby the press portion 58 of the release plate 52 projects outwardly from the release operation hole 68 as shown in FIG. 2. When the press portion 58 is pressed into the buckle case 64, the buckle case 64 presents a side view in which a portion below the separator plate 70 is recessed, as shown in FIG. 3.

An oscillating arm 72 is pivotally supported on the pin 54 which pivotally supports the release plate 52. When the insert portion 25 of the tongue plate 24 is engaged with the lock pin 38, one ene of the oscillating arm 72 compresses a compression coil spring 74 confined between the buckle case 64 and itself while, the other end thereof actuates a detecting switch 76 secured to the buckle case 64. With this arrangement, it is possible to detect whether or not the tongue plate 24 is properly engaged with the buckle device 22.

In addition, the tongue plate 24 to be inserted is integrally mounted with a cover 78. When the tongue plate 24 is engaged with the buckle device 22, the cover 78 closes the tongue plate insertion hole 66.

Description will hereunder be given of the action of an embodiment of the invention with the abovedescribed arrangement. When the occupant inserts the insert portion 25 of the tongue plate 24 into the buckle device 22, the outer end of the webbing 10 is supported by the door 20 as shown in FIG. 1. At the time of insertion, the inclined portion 50 of the insert portion 25 of the tongue plate 24 causes the lock pin 38 to move along the slots 36, of the buckle base 26 whereby said lock pin 38 is separated from the release pin 44 to form therebetween an insertion path for the insert portion 25. After the insert portion 25 has been satisfactorily inserted, the lock pin 38 is biased by the biasing force of the tensile coil spring 48 to approach toward the release pin 44 and become engaged with the engageable groove 40, as shown in FIG. 2.

Thereafter, when the occupant opens the door 20 for entering the vehicle, the webbing 10 forms a space for allowing the occupant to enter the vehicle between the occupant's seat 18 and itself as shown in FIG. 1. If the occupant closes the door 20 upon being seated, then the webbing 10 is moved rearward in the vehicle in accordance with the circularly arcuate movement of the door 20, and the excess portion of the webbing is wound up into the retractor 12, so that the webbing 10 can be automatically fastened to the occupant.

During normal running condition of the vehicle, the occupant can change his driving posture by unwinding the webbing 10 from the retractor 12.

In an emergency of the vehicle such as a collision, the inertia lock mechanism, not shown, of the retractor 12 prevents the webbing from being unwound so that the occupant can be restrained by the webbing 10, the opposite ends of which are positively secured by the retractor 12 and the buckle device 22, respectively, safely securing the occupant. In the event of a collision, a high tension is generated in the webbing 10 due to the inertial force of the occupant. However, the engageable groove 40 of the tongue plate 24 is reliably engaged with the lock pin 38 and a slipping-off force of the tongue plate 24 acts to move the lock pin 38 and the release pin 44 in a direction perpendicular to the longitudinal directions of the respective slits, whereby the tongue plate 24 is reliably supported on the buckle device 22.

Next, in order for the occupant to escape from the vehicle after a collision, the occupant or a relief worker merely presses the press portion 58 of the release plate 52 into the buckle case 64 as shown in FIG. 3, then the slots 56 of the release plate 52 cause the release pin 44 to move along the slots 56 thereby separating release pin 44 from the lock pin 38. With this arrangement, the release pin 44 forms a path for the insert portion 25 to escape between the lock pin 38 and itself, whereby the tongue plate 24 is readily extractable from the buckle device 22, so that the occupant can be unfastened from the webbing 10 and open the door to quickly escape from the vehicle.

In addition, in this embodiment, description has been limited to the seatbelt system of the type wherein the webbing 10 obliquely restrains the upper body of the seated occupant. Needless to say, however, the present invention is applicable to other seatbelt systems including a three-point type seatbelt system.

As has been described hereinabove, the emergency buckle device according to the present invention contains an arrangement of a lock pin and a release pin, whereby the lock pin is moved when the tongue plate is inserted and the release pin is moved when the tongue plate is extracted.

This arrangement provides the emergency buckle device according to the present invention with advantages such as a more compact size and a better fastening of the webbing to the occupant. These advantages represent improvements over the prior art wherein the tongue plate is engaged with a single back plate.

What is claimed is:

1. An emergency buckle device for use in a seatbelt system wherein a restraining webbing is automatically fastened to an occupant upon entering a vehicle and with which the occupant can manually unfasten the webbing, comprising:
    (a) a main body having an opening and being secured to a door of the vehicle;
    (b) a tongue plate engaged with an outer end of the occupant restraining webbing and having an insert portion manually inserted in a first direction through said opening into said main body;
    (c) a release pin in said main body extending substantially perpendicular to said insert portion in said main body and moveable a predetermined distance substantially in the first direction;
    (d) a lock pin in said main body extending parallel to said release pin and moveable a predetermined distance substantially perpendicular to the first direction, said lock pin being moved by said insert portion away from said release pin to form therebetween a path for receiving said insert portion when said insert portion is manually inserted through said opening into said main body;
    (e) a resilient member between said lock pin and said release pin to bias both said pins toward each other so that both said pins secure the insert portion after the insert portion passes through the path between both said pins; and
    (f) a release plate pivoted at one end thereof to said main body by a pin extending parallel to said lock pin and said release pin, said release plate being engaged at its other end with said release pin and having a press portion between its ends, said press portion being accessible to the occupant so that said release pin can be manually moved away from the lock pin to thereby release said insert portion from said main body whereby said insert portion can be manually removed from said body in a second direction opposite to said first direction.

2. An emergency buckle device as set forth in claim 1, wherein said tongue plate is provided at said insert portion thereof with an engageable groove for being engaged with said lock pin upon insertion of said insert portion into said main body of said buckle device.

3. An emergency buckle device as set forth in claim 1, wherein said main body of said buckle device is covered with a case, said case being cuttingly provided at the upper portion thereof with an insertion hole for receiving said tongue plate disposed in a direction toward the interior of the compartment and at the lower portion thereof with a release operation hole for receiving said press portion of said release plate.

4. An emergency buckle device comprising a main body of buckle secured to a door of a vehicle and a tongue plate engaging the outer end of an occupant restraining webbing and being inserted into and engaged with said main body of buckle, characterizing that, said main body of buckle is solidly secured at the central portion thereof to the vehicle door and has two legs extended in parallel to each other and an insert portion of the tongue plate is inserted between said legs; two pairs of slots are penetratingly provided in the two legs of the main body of buckle, one pair thereof are formed to have longitudinal axes substantially perpendicular to the direction of inserting the tongue plate so as to receive a lock pin, and the other pair thereof are formed to have longitudinal axes substantially in the same direction as the direction of inserting the tongue plate so as to receive a release pin; said lock pin is biased in a direction of approaching the inserted tongue plate and said release pin is biased in a direction of extracting the tongue plate; and said insert portion of the tongue plate is provided at one side thereof with an engageable groove for being engaged with the lock pin and at the other side thereof with a straight-lined portion for abutting against the release pin; whereby, when the tongue plate is inserted, the lock pin comes into contact with the tongue plate to be moved in a direction of being separated from the tongue plate, and thereafter, is coupled into said engageable groove to prevent the tongue plate from being extracted then, and, when the occupant performs the release operation, an operating force, through the release plate, separates the release pin from the lock pin to form therebetween a path for allowing the tongue plate to escape therethrough.

5. An emergency buckle device for use in a seatbelt system wherein a restraining webbing is automatically fastened to an occupant upon entering a vehicle and with which the occupant can manually unfasten the webbing, comprising:
    (a) a main body secured to a door of the vehicle, said main body comprising two legs at opposite sides of an opening, said legs being parallel to each other;
    (b) a tongue plate engaged with an outer end of the occupant restraining webbing and having an insert portion manually inserted through said opening in a first direction into a space between said legs of said main body;
    (c) a lock pin and a release pin arranged in said main body of said buckle in a manner so as to be moveable a predetermined distance, said lock pin being moved away from said release pin when said tongue plate is manually inserted in a first direction into said main body, thereby forming a path for receiving said insert portion, said lock pin and said release pin securing said insert portion of said tongue plate after said tongue plate has been manually inserted;
    (d) slots through said parallel legs of said main body for receiving said lock pin and said release pin and guiding the movement of both said pins within a predetermined distance, wherein opposite end portions of said pins project from both said parallel legs;
    (e) tensile coil springs at outer sides of both said legs, one end of each said spring being engaged with the end portion of said lock pin and the other end of each said spring being engaged with the end portion of said release pin; and
    (f) a release plate, formed with a press portion to be manually operated by the occupant, for moving said release pin away from said lock pin to form therebetween a path for allowing said insert portion of said tongue plate to escape therethrough when said press portion is manually operated by the occupant.

* * * * *